Patented Mar. 15, 1932

1,849,572

UNITED STATES PATENT OFFICE

JOSEPH GYR, OF BASEL, SWITZERLAND, ASSIGNOR TO THE FIRM OF SOCIETY OF CHEMICAL INDUSTRY IN BASLE, OF BASEL, SWITZERLAND

DISAZO-DYESTUFFS AND PROCESS OF MAKING SAME

No Drawing. Application filed January 28, 1930, Serial No. 424,021, and in Switzerland February 2, 1929.

The present invention relates to the manufacture of new disazo-dyestuffs which are particularly suitable for the production of fast and level blue and grey tints on cotton and viscose. It comprises the process of making the new products, the new products themselves, and the material dyed with the said products.

The manufacture consists in coupling diazo-compounds of the benzene series which do not contain nitro-groups with a product of the general formula

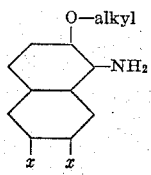

in which $x$ in one case signifies an hydrogen atom and in the other case an hydrogen atom or an $SO_3H$-group, then diazotizing the monoazo-dyestuff thus obtained and coupling with certain derivatives of the 2-amino-5-hydroxynaphthalene, i. e. compounds of the general formula

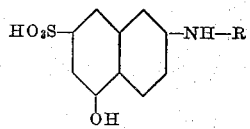

wherein R stands for an hydrogen atom or a phenyl or benzyl residue directly bound to the nitrogen atom and free from $NH_2$ groups. The dyestuffs thus obtained may be converted into new metal derivatives by treatment with agents yielding metals. A similar result is attained by coupling the diazotized monoazo-dyestuff with the 2-amino-5-hydroxynaphthalene in presence of an agent yielding metal. If there is used as the first diazotizing component one which contains a saponifiable acidyl-group the latter may be removed by treating the finished disazo-dyestuff with a saponifying agent.

The new dyestuffs which correspond with the general formula

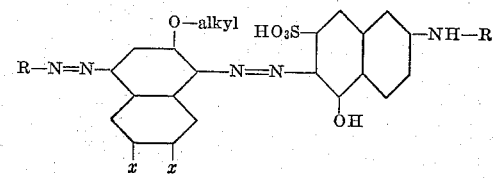

wherein R stands for a residue of a diazotizing component of the benzene series containing no nitro-group, $x$ in one case stands for a hydrogen atom and in the other for a hydrogen atom or an $SO_3H$ group, and $R_1$ for hydrogen or benzyl, methyl, ethyl, phenyl, (methyl)-phenyl, (alkoxy)-phenyl, etc., dye cotton and artificial fibers from regenerated cellulose blue tints which may vary, according to the components selected, from reddish-blue to green-blue. Such dyeings may have a remarkable fastness to light; also the property of many of these products to yield very equal tints on the so-called stripy viscose is of value.

The following examples illustrate the invention, the parts being by weight:—

Example 1

The diazo-solution produced from 17.3 parts of aniline-2-sulfonic acid is mixed with sodium acetate until the reaction for mineral acid can no longer be detected, and is then coupled with a neutral solution of 25.3 parts of 1-amino-2-methoxynaphthalene-6-sulfonic acid. The monoazo-dyestuff thus formed is dissolved by addition of sodium carbonate while heating, and is then salted out in the form of its sodium salt by addition of common salt; the sodium salt is then filtered and again dissolved to be mixed at 10° C. with 6.9 parts of sodium nitrite and afterwards with 30 parts of hydrochloric acid of 30 per cent strength. This diazo-solution is allowed to flow into a solution alkaline with sodium carbonate of 31.5 parts of 2-phenylamino-5-hydroxynaphthalene-7-sulfonic acid. When coupling is complete the dyestuff corresponding to the formula

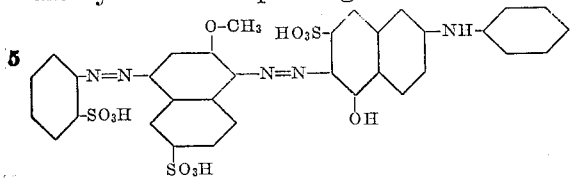

is salted out, filtered and dried. It dyes artificial silk from regenerated cellulose equal, clear blue tints. The final coupling may also be carried out in presence of pyridine.

Example 2

The disazo-dyestuff obtained as described in Example 1 from 17.3 parts of metanilic acid as first component instead of aniline-2-sulfonic acid is dissolved in 500 parts of water; the solution having been made slightly acid with acetic acid is mixed, while boiling, with a solution of copper sulfate of 10 per cent strength until no more copper is taken up by the dyestuff. The whole is then filtered and the solid matter dried. The dyestuff containing copper thus made dyes in a feebly alkaline bath a blue tint which is considerably more greenish than that of the product which does not contain copper.

For introducing the copper, cuprammonia or some other soluble complex copper compound may be used. This treatment may obviously be conducted in the dye-bath or on the fiber. Among the dyestuffs which are particularly suitable for making such complex metal compounds are those which contain a carboxyl-group or one or more COOH-groups in ortho-position to an OH-group.

The procedure is similar with other components. Among compounds whose diazo-compound may advantageously be used as first component may be named sulfanilic acid, metanilic acid, toluidine-sulfonic acid ($CH_3:NH_2:SO_3H=1:4:3$ or $1:4:2$ or $1:2:4$), mono-acetyl-1:4-phenylenediamine, 1-amino-4-acetylamino-benzene-2-sulfonic acid, 1-oxalylamino-4-aminobenzene-2-sulfonic acid, chloro-aniline-sulfonic acid ($NH_2:Cl:SO_3H=1:4:2$ or $1:4:3$ or $1:2:5$), dichloro-aniline-sulfonic acids ($NH_2:Cl:Cl:SO_3H=1:2:5:4$ or $1:2:5:6$), 2-acetylamino-4-chloro-5-aminophenol-methyl ether, xylidine-sulfonic acid ($CH_3:CH_3:NH_2:SO_3H=1:3:4:5$ or $1:3:4:6$), chloro-toluidinesulfonic acid ($CH_3:NH_2:Cl:SO_3H=1:2:5:3$), aniline-2:4- or -3:5- or 2:5-disulfonic acid, toluidine-2:5-disulfonic acid ($CH_3:NH_2:SO_3H:SO_3H=1:4:2:5$), 4'-methyl-2-aminodiphenylsulfone-4-sulfonic acid, para-aminosalicylic acid, sulfoaminosalicylic acid ($OH:NH_2:COOH:SO_3H=1:6:2:4$), 3-amino-4-sulfobenzoic acid, 4'-methyl-4-aminodiphenylamine-2-sulfonic acid, and so on. As suitable middle components may be named the methyl, ethyl, propyl, butyl etc. ethers of the 1-amino-2-hydroxynaphthalene, or the 6- or 7-sulfonic acids of these products. As suitable end components may be named various N-(methyl)-phenyl, N-(dimethyl)-phenyl, N-(methoxy)-phenyl, N-hydroxyphenyl-, N-hydroxyphenylcarboxylic acids, N-benzyl-, N-alkyl-derivatives of 2-amino-5-hydroxynaphthalene-7-sulfonic acid.

The following table shows the shades of some of the combinations of the present invention:—

| | 1st component | 2nd component | 3rd component | Shade of dyeing |
|---|---|---|---|---|
| I. | 1:3-aniline sulphonic acid | 1-amino-2-methoxy-naphthalene-6-sulfonic acid | 2-amino-5-hydroxy-naphthalene-7-sulfonic acid | Reddish-blue |
| II. | Do. | Do. | 2-phenylamino-5-hydroxynaphthalene-7-sulfonic acid | Blue |
| III. | Monoacetyl-1:4-phenylene-diamine | Do. | Do. | Do. |
| | Do. | Do. | Do. (Copper compound) | Do. |
| IV. | 1-amino-4-acetylamino-benzene-2-sulphonic acid | Do. | 2-amino-5-hydroxy-naphthalene-7-sulphonic acid | Greenish-blue |
| V. | Do. | Do. | 2-phenylamino-5-hydroxynaphthalene-7-sulphonic acid | Do. |
| VI. | Do. | 1-amino-2-ethoxy-naphthalene-6-sulfonic acid | Do. | Do. |
| VII. | Aminocresol-methylether $CH_3:NH_2:OCH_3=1:3:4$ | 1-amino-2-methoxy-naphthalene-6-sulfonic acid | 2-phenylamino-5-hydroxynaphthalene-7-sulfonic acid | Blue |
| VIII. | Do. | Do. | 2-amino-5-hydroxynaphthalene-7-sulfonic acid | Navy-blue |
| IX. | Toluidine-sulfonic acid $CH_3:NH_2:SO_3H=1:4:3$ | Do. | Do. | Reddish-blue |
| X. | Do. | Do. | 2-phenylamino-5-hydroxynaphthalene-7-sulfonic acid | Do. |
| XI. | Chloro-aniline-sulfonic acid $NH_2:Cl:SO_3H=1:4:2$ | Do. | Do. | Greenish-blue |
| XII. | Do. | Do. | 2-amino-5-hydroxynaphthalene-7-sulfonic acid. | Blue |
| XIII. | Chloro-aniline-sulfonic acid $NH_2:Cl:SO_3H=1:2:5$ | Do. | Do. | Reddish-blue |
| XIV. | Do. | Do. | 2-phenylamino-5-hydroxynaphthalene-7-sulphonic acid | Blue |
| XV. | Chloro-aniline-sulphonic acid $NH_2:Cl:SO_3H=1:4:3$ | Do. | Do. | Do. |
| XVI. | Do. | Do. | 2-amino-5-hydroxynaphthalene-7-sulfonic acid | Reddish-blue |
| XVII. | 2-acetylamino-4-chloro-5-aminophenol-methylether | Do. | Do. | Green-blue |
| XVIII. | Do. | Do. | Do. (Saponified after the coupling) | Do. |

| | 1st component | 2nd component | 3rd component | Shade of dyeing |
|---|---|---|---|---|
| XIX. | 1-ethoxy-4-aminobenzene-3-sulfonic acid | 1-amino-2-methoxy-naphthalene-6-sulfonic acid | 2-phenylamino-5-hydroxynaphthalene-7-sulphonic acid | Greenish-blue |
| XX. | Xylidine-sulfonic acid $CH_3:CH_3:NH_2:SO_3H=1:3:4:5$ | Do. | Do. | Reddish-blue |
| XXI. | Do. | Do. | 2-amino-5-hydroxynaphthalene-7-sulfonic acid | Do. |
| XXII. | 4'-methyl-2-aminodiphenyl-sulfone-4-sulfonic acid | Do. | Do. | Greenish-blue |
| XXIII. | Do. | Do. | 2-phenylamino-5-hydroxynaphthalene-7-sulfonic acid | Do. |
| XXIV. | Chloro-toluidine-sulfonic acid $CH_3:NH_2:Cl:SO_3H=1:2:5:3$ | Do. | Do. | Reddish-blue |
| XXV. | Aniline-2:5-disulfonic acid | Do. | Do. | Greenish-blue |
| XXVI. | Toluidine-disulfonic acid $CH_3:NH_2:SO_3H:SO_3H=1:4:2:5$ | Do. | Do. | Do. |
| XXVII. | 5-amino-2-hydroxybenzoic-acid | Do. | Do. | Do. |
| | Do. | Do. | Do. | Do. |
| XXVIII. | Do. | Do. | (Copper compound) 2-amino-5-hydroxynaphthalene-7-sulfonic acid | Blue |
| | Do. | Do. | Do. | Greenish-blue |
| XXIX. | 3-amino-4-sulfo-benzoic acid | Do. | (Copper compound) 2-phenylamino-5-hydroxynaphthalene-7-sulfonic acid | Do. |
| | Do. | Do. | Do. | Green-blue |
| XXX. | 4'-methyl-4-amino-diphenylamine-2 sulfonic acid. | Do. | (Copper compound.) 2-amino-5-hydroxynaphthalene-7-sulfonic acid | Do. |

The formula of the dyestuff V. corresponds with the following:—

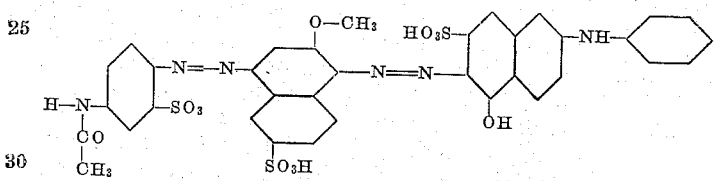

The formula of the dyestuff XVIII corresponds with the following:—

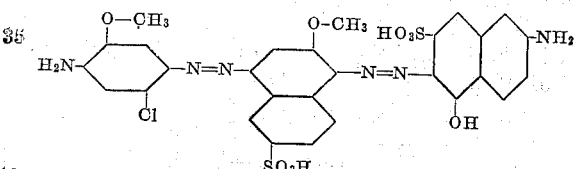

What I claim is:—

1. A manufacture of disazo-dyestuffs dyeing cotton and viscose silk blue to greenish-blue tints, consisting in coupling a diazo-compound of the benzene series which contains no nitro groups, with a compound of the general formula

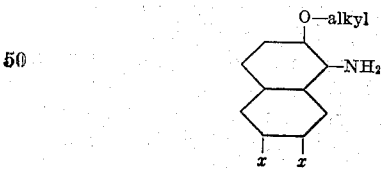

in which $x$ in one case stands for hydrogen and in the other case for $SO_3H$ or hydrogen, diazotizing the monoazo-dyestuff thus obtained and coupling the diazo-compound in an alkaline medium with a compound of the general formula

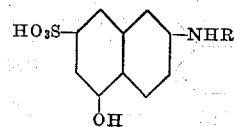

wherein R stands for an hydrogen atom or a phenyl or benzyl residue directly bound to the nitrogen atom and free from $NH_2$ groups.

2. A manufacture of disazo-dyestuffs dyeing cotton and viscose silk blue to greenish-blue tints, consisting in coupling a diazo-compound of the benzene series which contains no nitro groups, with a compound of the general formula

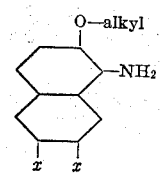

in which $x$ in one case stands for hydrogen and in the other case for $SO_3H$ or hydrogen, diazotizing the monoazo-dyestuff thus obtained and coupling the diazo-compound in an alkaline medium with a compound of the general formula

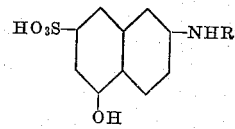

R signifying H or a benzene nucleus directly bound to the nitrogen atom and free from $NH_2$ groups.

3. A manufacture of disazo-dyestuffs dyeing cotton and viscose silk blue to greenish-blue tints, consisting in coupling a diazo-compound of the benzene series which contains no nitro groups, with a compound of the general formula

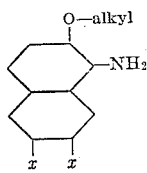

in which $x$ in one case stands for hydrogen and in the other case for $SO_3H$ or hydrogen, diazotizing the monoazo-dyestuff thus obtained and coupling the diazo-compound in an alkaline medium with a compound of the general formula

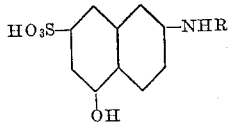

R signifying H or phenyl.

4. A manufacture of disazo-dyestuffs dyeing cotton and viscose silk blue to greenish-blue tints, consisting in coupling a diazo-compound of the benzene series which contains no nitro groups, with a compound of the general formula

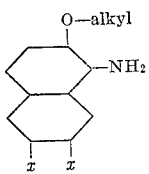

in which $x$ in one case stands for hydrogen and in the other case for $SO_3H$ or hydrogen, diazotizing the monoazo-dyestuff thus obtained and coupling the diazo-compound in an alkaline medium with a compound of the general formula

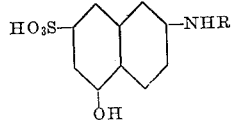

R signifying phenyl.

5. As new products of manufacture the disazo-dyestuffs corresponding to the general formula

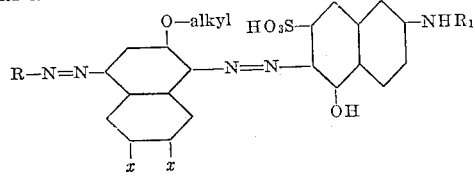

in which R signifies the residue of a diazo-compound of the benzene series which contains no nitro-groups, $x$ in one case stands for an hydrogen atom and in the other for an hydrogen atom or a sulfo-group, and $R_1$ signifying an hydrogen atom or an alkyl, benzyl or phenyl residue directly bound to the nitrogen atom and free from $NH_2$ groups, which products form dark powders, dissolving in water to blue to green-blue solutions, and dyeing cotton and viscose silk similar tints.

6. As new products of manufacture the disazo-dyestuffs corresponding to the general formula

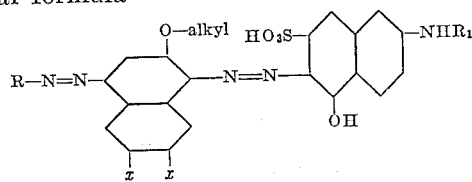

in which R signifies the residue of a sulfonated diazo-compound of the benzene series which contains no nitro-groups, $x$ in one case stands for an hydrogen atom and in the other for an hydrogen atom or a sulfo-group, and $R_1$ signifying an hydrogen atom or a phenyl residue directly bound to the nitrogen atom and free from $NH_2$ groups, which products form dark powders, dissolving in water to blue to green-blue solutions, and dyeing cotton and viscose silk similar tints.

7. As new products of manufacture the disazo-dyestuffs corresponding to the general formula

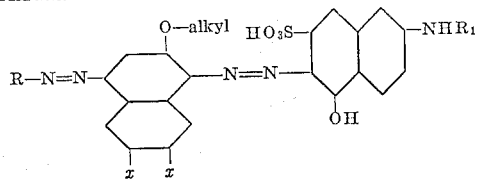

in which R signifies the residue of a diazo-compound of the benzene series which contains no nitro-groups and possesses an $SO_3H$-group in ortho-position to the azo-bridge, $x$ in one case stands for an hydrogen atom and in the other for an hydrogen atom or a sulfo-group, and $R_1$ signifying an hydrogen atom or phenyl, which products form dark powders, dissolving in water to blue to green-blue solutions, and dyeing cotton and viscose silk similar tints.

8. As a new product of manufacture the disazo-dyestuff corresponding to the formula

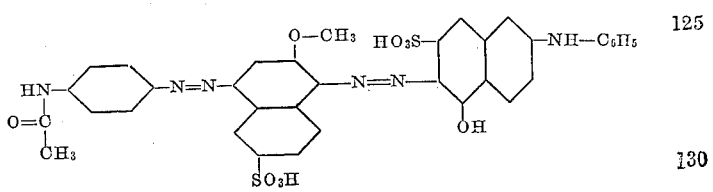

which product forms a dark powder which dissolves in water to a green-blue solution, dyeing cotton and viscose silk green-blue tints.

9. As a new product of manufacture the disazo-dyestuff corresponding to the formula

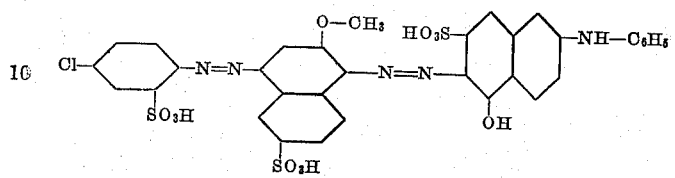

which product forms a dark powder which dissolves in water to a green-blue solution, dyeing cotton and viscose silk green-blue tints.

10. As a new product of manufacture the disazo-dyestuff corresponding to the formula

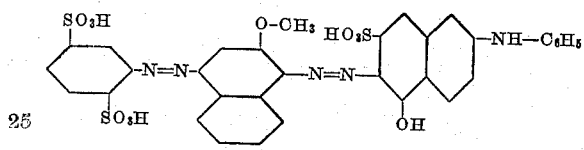

which product forms a dark powder which dissolves in water to a green-blue solution, dyeing cotton and viscose silk green-blue tints.

In witness whereof I have hereunto signed my name this 16th day of January, 1930.

JOSEPH GYR.